(12) United States Patent
Avis

(10) Patent No.: US 7,699,726 B2
(45) Date of Patent: Apr. 20, 2010

(54) GAME BALL INCORPORATING A POLYMER FOAM

(75) Inventor: Richard Avis, Tigard, OR (US)

(73) Assignee: Nike, Inc., Beaverton, OR (US)

( * ) Notice: Subject to any disclaimer, the term of this patent is extended or adjusted under 35 U.S.C. 154(b) by 335 days.

(21) Appl. No.: 10/421,570

(22) Filed: Apr. 23, 2003

(65) Prior Publication Data

US 2004/0213984 A1 Oct. 28, 2004

(51) Int. Cl.
*A63B 41/08* (2006.01)
*B32B 3/26* (2006.01)

(52) U.S. Cl. .................. 473/604; 428/166; 428/76; 428/71; 428/314.4; 521/142

(58) Field of Classification Search ............. 428/314.4, 428/166, 178, 76, 72, 71; 521/142; 473/604
See application file for complete search history.

(56) References Cited

U.S. PATENT DOCUMENTS

| 4,318,544 | A | | 3/1982 | Brine, Jr. | |
|---|---|---|---|---|---|
| 4,454,253 | A | * | 6/1984 | Murphy et al. | 521/112 |
| 4,542,902 | A | | 9/1985 | Massino | |
| 5,160,674 | A | | 11/1992 | Colton et al. | |
| 5,236,196 | A | | 8/1993 | Haines et al. | |
| 5,356,941 | A | * | 10/1994 | Sullivan et al. | 521/96 |
| 5,580,049 | A | | 12/1996 | Brantley | |
| 5,647,590 | A | * | 7/1997 | Walker et al. | 473/601 |
| 5,649,701 | A | * | 7/1997 | Mills et al. | 40/327 |
| 5,823,889 | A | * | 10/1998 | Aoyama | 473/374 |
| 6,220,979 | B1 | | 4/2001 | Chan | |
| 6,306,054 | B1 | | 10/2001 | Dobrounig | |

2003/0228946 A1 * 12/2003 Chan

FOREIGN PATENT DOCUMENTS

| DE | 4339677 | 11/1994 |
|---|---|---|
| DE | 10042244 | 3/2002 |
| EP | 0608143 | 7/1994 |
| EP | 1080745 | 3/2001 |
| WO | WO9315132 | 8/1993 |

OTHER PUBLICATIONS

Zotefoams Bulletin, 6 pages, May 1996.*
Wilson Sporting Goods, "Wilson Sporting Goods Technology," 2 pages, www.wilsonsports.com.
"The Properties of Crosslinked Foams Produced from Metallocene Polyolefins" by D. Eaves; Polymers and Polymer Composites, Rapra Technology, Shawbury, Shrewbury, GB, vol. 5, No. 7, 1997, pp. 477-482.
International Search Report in corresponding PCT matter: International Application No. PCT/US2004/008179, mailed Aug. 25, 2004.

* cited by examiner

*Primary Examiner*—Hai Vo
(74) *Attorney, Agent, or Firm*—Banner & Witcoff, Ltd.

(57) ABSTRACT

A game ball is disclosed that includes a polymer foam layer processed with an inert fluid blowing agent, such as nitrogen. The polymer foam may be a polyolefin material, such as polyethylene, polypropylene, and ethylvinylacetate, and the inert fluid blowing agent may have a relatively high-purity. The polymer foam may be manufactured with a process that includes impregnating a polymer with the inert fluid blowing agent and expanding the polymer by heating the polymer above a softening temperature of the polymer, reducing a fluid pressure surrounding the polymer, and cooling the polymer. The game ball may be a soccerball, football, or volleyball, for example, that includes the polymer foam.

3 Claims, 2 Drawing Sheets

Figure 3

| | FIFA Standards | Conventional Soccerballs | Prototype Soccerballs A | Prototype Soccerballs B | Prototype Soccerballs C |
|---|---|---|---|---|---|
| Rebound (centimeters) | 120-165 | 136-137 | 137-139 | 138-140 | 137-139 |
| Size Expansion (centimeters) | 1.5 | 0.85 | 0.54 | 0.66 | 0.64 |
| Sphericity Deviation (%) | 1.5 | 1.03 | 1.08 | 0.93 | 1.04 |
| Air Pressure Loss (bar) | 0.1 | 0.05 | 0.04 | 0.04 | 0.04 |
| Water Absorption (%) | 15 | 8.7 | 7.8 | 9.6 | 7.4 |
| Abrasion Loss (grams) | n/a | 1.5 | 1.0 | 1.0 | 1.0 |

GAME BALL INCORPORATING A POLYMER FOAM

BACKGROUND OF THE INVENTION

1. Field of the Invention

The present invention relates to materials utilized in the construction of a game ball. The invention concerns, more particularly, a game ball that incorporates a polymer foam processed with an inert fluid blowing agent, such as nitrogen.

2. Description of Background Art

The game of soccer is played on a turf field having a length of approximately 100 meters and goals located at opposite ends of the field. Competing teams attempt to advance a soccerball, which is also referred to as a football, along the length of the field in opposite directions without using their hands to grasp or otherwise affect movement of the soccerball. The object of the game of soccer is for the players of one team to cooperatively advance the soccerball and place the soccerball into their designated goal, thereby scoring a point. Simultaneously, the other team attempts to cooperatively thwart the advance so as to regain possession of the soccerball and advance the soccerball toward the opposite goal.

The Fédération Internationale de Football Association (FIFA) promulgates standards that rank soccerballs as being either approved or inspected. Soccerballs bearing the approved denomination are generally recognized as embracing the quality necessary for international competition, whereas soccerballs bearing the inspected denomination may be utilized for lower competition levels or practice. In order to qualify for the approved denomination, a soccerball must fall within a narrow range of tolerances based upon such properties as weight, circumference, sphericity, pressure loss, water absorption, rebound, and shape and size retention.

The standards set by FIFA generally relate to the physical properties and performance of the soccerball rather than the specific structure of the soccerball or the materials utilized in the various components of the soccerball. Accordingly, soccerball manufacturers often vary the structure and materials of commercially-available soccerballs in an attempt to enhance the physical properties of the soccerball. In general, however, modern soccerballs have a substantially conventional configuration, as discussed below.

A conventional soccerball is substantially spherical and has a layered construction that includes a cover, a supportive structural lining, and an inflatable bladder. The cover is generally formed from a plurality of durable, wear-resistant panels that are stitched together along abutting sides to form a closed surface. The traditional soccer ball cover is modeled on a regular, truncated icosahedron and includes, therefore, twenty hexagonal panels and twelve pentagonal panels, and a plurality of other panel configurations are also conventionally utilized. Although the cover may be formed from full-grain leather, the cover of conventional soccerballs is often formed from polyurethane or polyvinyl chloride materials. The lining is generally located between the cover and the bladder to resist the outward pressure provided by the bladder, thereby retaining a spherical and dimensionally-consistent shape. Depending upon the manufacturer, the lining may be formed of natural cotton textiles, polyester textiles, or textiles that incorporate both cotton and polyester fibers. In addition to textiles, the lining may also incorporate a latex layer, for example. The bladder, which is the inner-most layer of the conventional soccerball, is formed of a material that is substantially impermeable to air, such as natural rubber, butyl rubber, and polyurethane. The bladder generally includes a valved opening, accessible through the cover, to facilitate the introduction of air. When inflated, the bladder expands and places a uniform outward pressure on the lining and cover, thereby inducing the soccerball to take a substantially spherical shape.

In addition to the cover, lining, and bladder, a soccerball may also incorporate a polymer foam layer to enhance pliability and cushioning. The foam layer generally has a thickness of 1 to 2 millimeters and is positioned between the cover and lining. Suitable materials for the foam layer include most polyolefin foams, which are prepared by the polymerization of olefins as the sole monomers. Examples of polyolefin foams include polyethylene, polypropylene, and ethylvinylacetate.

A first manufacturing process commonly employed to produce polyolefin foam suitable for the conventional soccerball utilizes chlorofluorocarbons, hydrofluorocarbons, or volatile hydrocarbons as a blowing agent. The resulting polyolefin foam is not cross-linked and may release chemicals that are considered to be detrimental to the global environment. A similar release of chemicals may also result from errors in the manufacturing process itself.

A second manufacturing process commonly employed to produce polyolefin foam suitable for the conventional soccerball utilizes a chemical blowing agent that expands through a decomposition reaction. In manufacturing the foam, a chemical such as azodicarbonamide is incorporated into polyolefin resin. A decomposition reaction involving the azodicarbonamide is then initiated by heat and produces gasses, such as nitrogen, carbon monoxide, carbon dioxide, and ammonia. The various gasses expand the polyolefin resin, thereby producing the polyolefin foam. A significant portion of the azodicarbonamide remains as residue, however, within the resulting polyolefin foam. Depending upon the density of the polyolefin foam, approximately 10% of the foam weight may be due to the azodicarbonamide residue. Accordingly, only 90% of the polyolefin foam weight is available to contribute to the mechanical performance of the polyolefin foam. Furthermore, if a soccerball incorporating a polyolefin foam is exposed to high ambient temperatures, then the azodicarbonamide decomposition reaction may reinitiate, thereby altering the properties of the polyolefin foam within the soccerball.

SUMMARY OF THE INVENTION

The present invention is a game ball that includes a polymer foam processed with a nitrogen blowing agent. As discussed above in the Background of the Invention, a conventional foam is often incorporated into game balls, such as a soccerball. The conventional foam may be processed with chlorofluorocarbon, hydrofluorocarbon, or volatile hydrocarbons as a blowing agent, which is detrimental to the environment. Alternately, the conventional foam may be formed with a chemical blowing agent, such as azodicarbonamide, that leaves a residue within the resulting foam. In contrast with the conventional foam, the polymer foam utilized in the game ball of the present invention is formed with a nitrogen blowing agent that does not detrimentally affect the environment or leave a substantial chemical residue. Alternately, a variety of other generally inert fluids may be utilized as the blowing agent, including helium, neon, or argon, for example.

In forming the polymer foam, the nitrogen blowing agent is utilized to impregnate a polymer material, which may be a polyolefin such as polyethylene, ethylvinylacetate, or polypropylene. The nitrogen-impregnated polymer material is then heated and the pressure around the polymer material is reduced, thereby causing the nitrogen to expand. Upon cooling, the expanded polymer material solidifies and forms the resulting polymer foam. Nitrogen of varying purities is suitable as the blowing agent. Nitrogen with at least 99.9% purity, however, is generally utilized in the manufacture of nitrogen-blown polymer foams.

The nitrogen-blown polymer foam may be incorporated into a variety of game ball types, including soccerballs, volleyballs, or footballs, for example. Such game balls generally include a cover that is formed of a plurality of panels connected along abutting edges. The nitrogen-blown polymer foam is positioned within the cover, and other layers that include a textile layer and a bladder may be located within the polymer foam.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention, as well as the following Detailed Description of the Invention, will be better understood when read in conjunction with the accompanying drawings.

FIG. 3 is a table presenting data from an experimental analysis of various conventional and prototype soccerballs.

DETAILED DESCRIPTION OF THE INVENTION

The following discussion and accompanying figures disclose a game ball in accordance with the present invention. The game ball is discussed and depicted as a soccerball incorporating a polymer foam processed with a nitrogen blowing agent. Alternately, a variety of other generally inert fluids may be utilized as the blowing agent, including helium, neon, or argon, for example. The following discussion is specifically directed to the soccerball in order to demonstrate the structure and features of an exemplar game ball that incorporates the polymer foam. Those of ordinary skill in the relevant art will appreciate, however, that the principles disclosed herein are equally applicable to other types of game balls, including volleyballs and footballs, for example.

Figure 1:
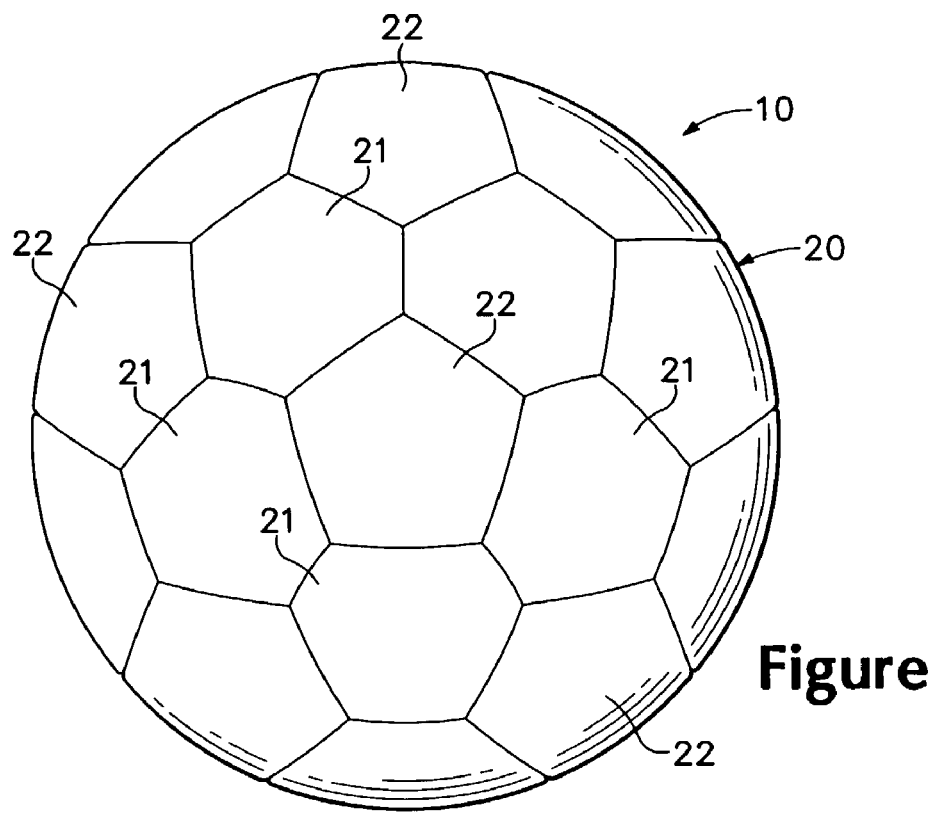
FIG. 1 is a perspective view of a soccerball in accordance with the present invention.
Figure 2:
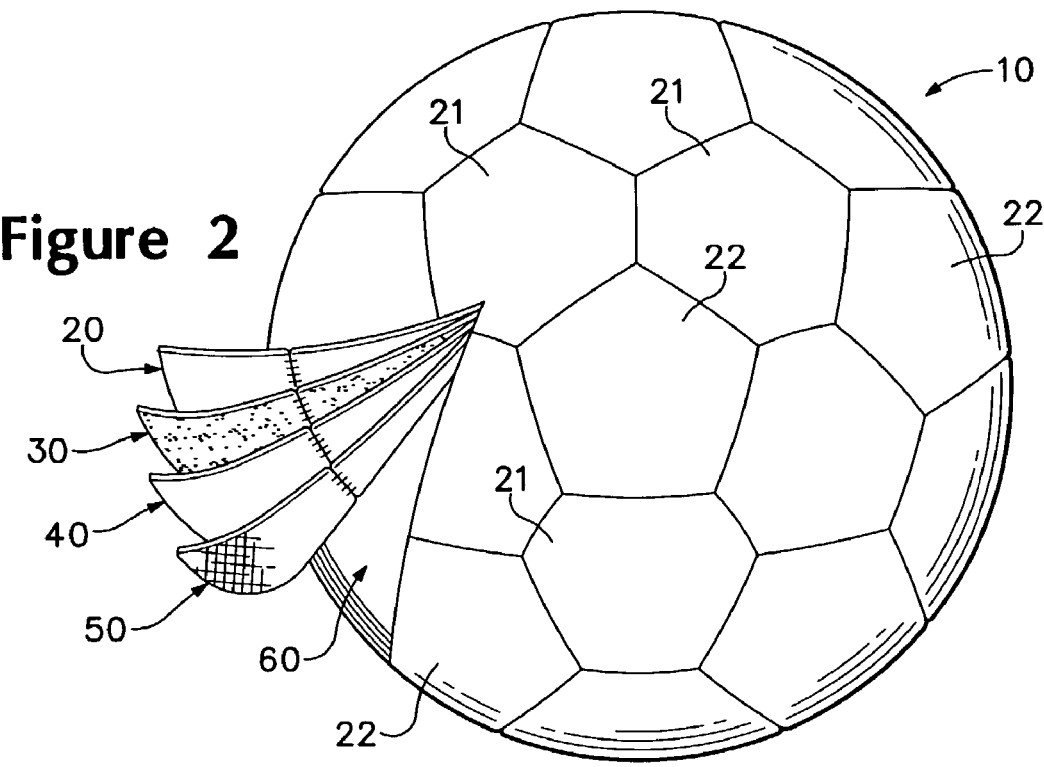
FIG. 2 is a perspective view of the soccerball with selected layers peeled away.

A game ball 10 having the configuration of a soccerball is depicted in FIGS. 1 and 2. The primary elements of ball 10 are cover 20, a foam layer 30, a latex layer 40, a textile layer 50, and a bladder 60. Cover 20 is formed from twenty hexagonal panels 21 and twelve pentagonal panels 22 that are stitched together along abutting sides to form an exterior surface for ball 10. The various panels 21 and 22 are depicted as having the shapes of equilateral hexagons and pentagons. In further embodiments, panels 21 and 22 may have non-equilateral shapes; selected panels 21 and 22 may be formed integral with adjacent panels 21 and 22 to form bridged panels that reduce the number of seams requiring stitching; or panels 21 and 22 may have other shapes that combine in a tessellation-type manner to form cover 20. The material selected for cover 20 may be leather, polyurethane, polyvinyl chloride materials, or other materials that are both durable and wear-resistant.

Foam layer 30 is located adjacent to an interior surface of cover 20 and enhances the overall pliability and cushioning of ball 10. The thickness of foam layer 30 may range from 0.5 millimeters to 4.5 millimeters. Suitable materials for foam layer 30 include a variety of polymer foams, such as polyolefin foams, that are processed with a nitrogen blowing agent. Examples of polyolefin foams include, for example, low-density polyethylene, high-density polyethylene, polypropylene, and ethylvinylacetate. Alternately, a variety of other generally inert fluids may be utilized as the blowing agent for the polymer foam, including helium, neon, or argon, for example.

As discussed in the above Background of the Invention, a polyolefin foam is often incorporated into the conventional soccerball. The polyolefin foam may be processed with chlorofluorocarbon, hydrofluorocarbon, or volatile hydrocarbons as a blowing agent, which is detrimental to the environment. Alternately, the polyolefin foam may be formed with a chemical blowing agent, such as azodicarbonamide, that leaves a residue within the resulting polyolefin foam. The residue contributes to the weight of the polyolefin foam, and the conventional soccerball, but does not contribute to the mechanical performance of the polyolefin foam. Furthermore, the azodicarbonamide may continue to decompose after the polyolefin foam is incorporated into the conventional soccerball. Further decomposition may increase the cell size within the polyolefin foam, thereby changing the properties of the foam.

To address the issues with conventional polyolefin foam materials, foam layer 30 of the present invention incorporates a polymer foam processed with a nitrogen blowing agent. Such foams, which are referred to hereafter as nitrogen-blown polymer foams, are commercially-available from Zotefoams Inc. of Croyden, England. under the tradenames of PLASTAZOTE, which is a closed cell, cross-linked polyethylene foam; EVAZOTE and SUPAZOTE, which are closed cell, cross-linked ethylene copolymer foams; and PROPOZOTE, which is a closed cell polypropylene copolymer foam. In contrast with the chlorofluorocarbon, hydrofluorocarbon, or volatile hydrocarbon blowing agents that are commonly utilized is conventional polymer foam production, nitrogen is naturally-abundant in the atmosphere and considered to the generally inert, thereby promoting global environmental well-being and the health of the individuals producing and handling the nitrogen-blown polymer foams. In addition, nitrogen-blown polymer foams do not include a chemical residue, as with polymer foams that are blown with the decomposition reaction of azodicarbonamide. In comparison with conventional polymer foams, therefore, the lack of chemical residue in the nitrogen-blown polymer foams increases the mechanical performance per unit weight.

A further advantage to nitrogen-blown polymer foams relates to the resulting cells, or gas-filled pockets, within the foam. The conventional polymer foams include cells with a wide range of sizes. In contrast, the cell sizes of nitrogen-blown polymer foams are substantially more uniform, thereby imparting more consistent properties throughout the foam. This is not to imply that nitrogen-blown polymer foams are free from varying cell sizes. Rather, the frequency with which varying cell sizes occur in nitrogen-blown polymer foams is significantly lower than with conventional polymer foams. Accordingly, the standard deviation in cell size of nitrogen-blown polymer foams is less than the standard deviation in cell size of the conventional foam materials.

Nitrogen-blown polymer foams are generally manufactured through a three-step process that includes extrusion, impregnation, and expansion. In the extrusion step, a base resin and additive ingredients are mixed and fed into an extruder, with the additive ingredients including coloring agents, fire retardants, or plasticizers, for example. The base resin and additive ingredients are then extruded in a desired shape to form a cross-linked plastic. Cross-linking may be achieved through irradiation or a chemical, for example In the impregnation step, the extruded plastic is placed in a high-pressure autoclave and heated to a temperature that exceeds the softening temperature. The plastic is also subjected to relatively high pressures of substantially pure nitrogen such that the nitrogen dissolves into the heated plastic material. The plastic is subsequently cooled, thereby confining or locking the nitrogen within the plastic. In the expansion step, the nitrogen-impregnated plastic is positioned in a low-pressure autoclave and again heated to a temperature that exceeds the softening temperature. A moderate air pressure that surrounds the plastic during the heating is then reduced such that the nitrogen within the plastic expands, thereby foaming the plastic in a uniform manner. Accordingly, only nitrogen is utilized as the blowing agent, rather than chlorofluorocarbon, hydrofluorocarbon, volatile hydrocarbons, or azodicarbonamide, which may have an adverse effect upon the environment or the polymer foam itself.

Nitrogen of varying purities is suitable as the blowing agent in the process discussed above. High-purity nitrogen, however, is generally utilized in the manufacture of nitrogen-blown polymer foams. For purposes of the present application, nitrogen having a purity of 99.9% may be considered as having high-purity. A benefit to utilizing high-purity nitrogen gas relates to the predictable expansion properties of the high-purity nitrogen at various pressure-temperature combinations. Predictability of the expansion would decrease with the introduction of additional gasses due to the different expansion properties of the additional gasses at the various pressure-temperature combinations. Accordingly, the use of high-purity nitrogen provides predictable expansion in the polymer and results in a uniform resulting foam. If other inert fluid blowing agents are utilized, the other inert fluid blowing agents may exhibit a high-purity of 99.9%.

In manufacturing ball 10, cover 20, foam layer 30, latex layer 40, and textile layer 50 are bonded together to form a single laminated material. Heat, pressure, and/or an adhesive may be utilized in bonding the components. The individual panels 21 and 22 are die cut from the laminated material and joined together. Bladder 60 is then placed within the joined elements, thereby substantially completing the manufacture of ball 10.

In addition to cover 20 and foam layer 30, ball 10 includes latex layer 40, textile layer 50, and bladder layer 60. Latex layer 40 may be utilized within ball 10 and is located adjacent to foam layer 30 and opposite cover 20. The purpose of latex layer 40 is to provide energy return. Textile layer 50 is positioned between latex layer 40 and bladder 60 and may be formed of natural cotton textiles, polyester textiles, or textiles that incorporate both cotton and polyester fibers. Bladder 60 is the inner-most layer of ball 10. The material forming bladder 60 is substantially impermeable to air, and may include natural rubber, butyl rubber, or polyurethane. Bladder 60 may include a valved opening (not depicted) that extends through textile layer 50, latex layer 40, foam layer 30, and cover 20 to facilitate the introduction of air. Alternately, the valved opening may be slightly recessed below the level of cover 20. When inflated the proper pressure, bladder 60 expands, thereby inducing ball 10 to take a substantially spherical shape.

An experimental analysis compared the physical properties and performance of conventional soccerballs with a plurality of prototype soccerballs having the configuration of ball 10. As a control measure in the experimental analysis, the overall structure of the conventional soccerballs and the prototype soccerballs were substantially identical, with the exception of the polymer foam utilized for the foam layer. Whereas the conventional soccerballs incorporated a conventional polyethylene foam having a thickness of 2 millimeters, the prototype soccerballs utilized nitrogen-blown polymer foams with a thickness of 2 millimeters. Differences between the conventional soccerballs and the prototype soccerballs may be generally attributed, therefore, to the different types of foam.

Three types of prototype soccerballs were prepared for the experimental analysis, and will be distinguished hereafter as Prototype Soccerballs A, B, and C. Prototype Soccerballs A incorporated a nitrogen-blown polyethylene foam, whereas Prototype Soccerballs B and C utilized two different types of nitrogen-blown ethylene copolymer foams. The FIFA standards relating to the approved denomination require that soccerballs have, inter alia, a weight between 420 and 445 grams and a circumference between 68.5 and 69.5 grams. All soccerballs, whether conventional or prototype, exhibited a weight and circumference within the FIFA weight and circumference ranges for the approved denomination.

The conventional and prototype soccerballs were subjected to rebound, size expansion, sphericity deviation, air pressure loss, and water absorption tests, which are also included in the FIFA standards. In addition, the soccerballs were tested for abrasion losses. The results of the experimental analysis is presented in the table of FIG. 3. In general, Prototype Soccerballs A, B, and C performed better than the conventional soccerballs, with all soccerballs falling within the FIFA standards for the approved designation on all tests. The rebound test involved dropping the various soccerballs from a height of 2 meters onto a steel plate and measuring the rebound height. Each of Prototype Soccerballs A, B, and C exceeded the rebound height of the conventional soccerballs. The size expansion, sphericity deviation, air pressure loss, and abrasion loss tests were conducted by propelling the various soccerballs at approximately 50 kilometers per hour toward a steel plate for 2000 cycles. Prototype Soccerballs A, B, and C each exhibited less circumferential expansion, less pressure loss, and less abrasion than the conventional soccerballs, and Prototype Soccerballs B exhibited less sphericity deviation than the conventional soccerballs. The water absorption test was conducted by immersing the various soccerballs in water for a predetermined period of time and measuring the resulting mass change, with Prototype Soccerballs A and C both exhibiting less overall absorption. The experimental analysis of the soccerballs demonstrated, therefore, that soccerballs having the configuration of ball 10, which incorporates a nitrogen-blown polymer foam, generally performs in a manner that exceeds the conventional soccerball.

The generally enhanced performance of Prototype Soccerballs A, B, and C, when compared to the conventional soccerballs, may be attributed to a variety of factors relating to the nitrogen-blown polymer foams. As discussed above, conventional foam materials may have a less uniform cell structure and may incorporate a chemical residue that contributes to the weight of the foam, but does not contribute to the mechanical performance of the foam. The cell structure and residue weight of conventional foam materials, either individually or in combination, may account for the enhanced performance of Prototype Soccerballs A, B, and C.

The specific configuration of ball 10 described above may be altered within the scope of the present invention. For example, latex layer 40 or textile layer 50 may be omitted.

Ball 10 is disclosed as a soccerball, and the specific configuration disclosed for cover 20 is generally specific to soccerballs. The present invention is intended to cover volleyballs and footballs, however, that incorporate a nitrogen-blown polymer foam. In further embodiments, therefore, ball 10 may be a volleyball or football, for example, which has a substantially different cover configuration, and, in the case of the football, substantially different shape. Accordingly, various modifications may be made to the structure of ball 10 without departing from the scope of the present invention.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

That which is claimed is:

1. A soccerball comprising:
    a cover that forms an exterior surface of the soccerball, the cover including a plurality of panels connected along abutting edges;
    a foam layer located adjacent to the cover, the foam layer including a closed cell, cross-linked, foam processed with a nitrogen blowing agent having at least 99.9% purity, the foam layer having a thickness ranging from 0.5 to 4.5 mm, wherein a material of the foam layer is selected from a group consisting of low-density polyethylene, high-density polyethylene, polypropylene and ethylvinylacetate;
    a textile layer located adjacent to the foam layer, the textile layer including at least one textile material; and
    an inflatable bladder located adjacent to the textile layer;
    wherein the soccerball has a rebound ranging from 138 to 140 cm; a size expansion of from 0.54 to 0.66 cm.

2. The soccerball of claim 1, wherein the foam layer is manufactured through a process that includes:
    providing a polymer,
    impregnating the polymer with a nitrogen blowing agent having at least 99.9% purity, and
    expanding the polymer by heating the polymer above a softening temperature of the polymer, reducing a fluid pressure surrounding the polymer, and cooling the polymer to form the closed cell, cross-linked, foam.

3. The soccerball of claim 1, wherein the panels include twenty hexagonal panels and twelve pentagonal panels.

* * * * *